Patented Feb. 5, 1946

2,394,025

UNITED STATES PATENT OFFICE 2,394,025

SYNTHETIC RUBBER PRODUCT AND METHOD OF MAKING THE SAME

Theodore A. Te Grotenhuis, Olmsted Falls, Ohio

No Drawing. Application December 28, 1940, Serial No. 372,182

3 Claims. (Cl. 260—41)

This invention relates to products employing unmasticated synthetic rubber and to a method of preparing the same, and particularly to a method of preparing such products reinforced with finely divided carbon.

The preparation of rubber articles without mastication from a finely divided rubberlike material, such as a rubber latex or a rubber powder, has heretofore been proposed. Such a process has many advantages over the conventional method of masticating compounding agents into solid rubber, in that heavy machinery need not be used and the rubber itself has a molecular structure not disintegrated by mastication and is, therefore, more age-resistant and wear-resistant than masticated rubber. The preparation of articles directly from latices or powdered rubber has not, however, displaced to any appreciable degree the older method of preparing articles from masticated rubber, because it has not heretofore been possible without mastication to obtain any substantial advantages by the addition of substantial quantities of carbon black and the like.

Carbon black greatly reinforces natural rubbers and most synthetic rubbers, particularly those having a substantial amount of chemical unsaturation, with the exception of neoprene (polychloroprene), so that their tensile strength and other properties of the compound are greatly improved. However, when carbon black is incorporated into a rubber latex or powdered rubber, no appreciable reinforcing effect or other improvement is noted. It acts only as a filler or diluent.

In my co-pending application Serial No. 355,497, filed September 5, 1940, of which this application is a continuation-in-part, I have described a method of preparing reinforced rubber articles by polymerizing a mixture of polymerizable material and carbon black in a finely divided form to provide a finely divided, reinforced synthetic rubber which may be utilized directly in preparing shaped, unmasticated rubber articles having even more desirable properties than articles produced from a masticated rubber mix of similar composition. The invention therein disclosed is applicable to the preparation of reinforced, unmasticated synthetic rubber articles comprising any synthetic rubber which is of the type that is reinforceable by carbon black when it is milled or masticated therein, and which may be produced by emulsion polymerization, or by polymerization in finely divided form.

The present invention is not restricted to the preparation of articles comprising a synthetic rubber produced by emulsion polymerization, and it is primarily applicable to the preparation of unmasticated, reinforced synthetic rubber articles from polymerized base materials having a continuous phase during the polymerization from the liquid to the rubberlike state. According to the present invention, articles comprising a reinforced, substantially unmasticated synthetic rubber are produced by forming a mixture of finely divided carbon, such as carbon black, and a non-emulsified liquid material capable of polymerizing to a synthetic rubber, preferably polymerizing the mixture into a polymerizable, relatively viscous liquid or plastic mixture with the polymerized material in a continuous phase, shaping this partially polymerized material, and then further polymerizing it into a rubberlike material of the desired shape. It is usually preferable to have at least the polymerization in the mold take place in the presence of polymerization accelerators, heat, and continuously applied pressure.

The carbon black is preferably incorporated in the polymerizable material before it is polymerized to the highly viscous state, but it, and other suitable compounding agents which do not prevent polymerization, may be incorporated any time before the material has polymerized to the rubberlike state, or to a state where milling is necessary and where a large amount of energy must as in the case of crude rubber be expended to form a homogeneous mixture. The polymerizable material in which the carbon black is incorporated may be any liquid or plastic which is capable of being polymerized into a synthetic rubber. But, the present invention is primarily adapted to the preparation of rubber articles from the types of synthetic rubbers which are substantially reinforced or have their tensile strength increased by carbon black when the latter is masticated therein.

The benefits of the invention are obtained with base materials which comprise diene hydrocarbons in substantial proportion and which are capable of being polymerized to rubbers which are substantially hydrocarbons or comprise hydrocarbons as a predominant ingredient. These rubbers may be the known copolymers of butadiene, isoprene, dimethyl butadiene, etc., with one or more polymerizable olefines, including ethylene, propylene and butenes, particularly those which are derived from the cracking gases of petroleum.

The finely divided carbon black may be intimately mixed with any or all of the organic liquid constituents which make up the polymerizable base of the rubber being prepared.

If the base is a gaseous material, the reinforcing agent may of course be readily incorporated either in a liquid prepared by first partially polymerizing the gas to the liquid state, or it may be incorporated in the gas while the latter is being maintained in the liquid state by suitable pressure or temperature, the pressure being maintained at least until most of the polymerizable material has polymerized to or through the liquid state at atmospheric pressure.

While the viscosity of the polymerizable liquid is still relatively low, the carbon black and other solids tend to settle out and it is, therefore, desirable that agitation of the mixture be provided during the initial polymerization and until the liquid reaches the relatively viscous state, where it has been found that there is practically no tendency for separation or settling of the solids from the liquid, and a homogeneous dispersion of the finely divided carbon is maintained.

In accordance with the preferred modification of this invention the liquid material has been polymerized to the highly viscous, plastic or gel-like state before it is incorporated into the mold, thus the amount of shrinkage is greatly reduced. It is, therefore, desirable in forming the articles that the polymerization outside of the mold progress as far as possible and yet retain a plastic or flowable material suitable for injection into the mold with substantial pressure.

As is sometimes the case with the polymerizable materials adapted to produce synthetic rubber, the polymerization does not proceed to substantial completion and a considerable proportion of substantially unpolymerized base material will remain over substantial periods in association with that which has polymerized to the desired state or even up to the crude rubber state. In such cases a large part of the substantially unpolymerized or relatively low boiling material may be separated from the more highly polymerized material before the latter plastic or fluid mixture is incorporated in the mold where polymerization progresses to final completion to produce a shaped article. This may conveniently be accomplished by lowering the pressure or raising the temperature sufficiently to cause vaporization of the more volatile ingredients which, of course, may be condensed and again utilized in future mixes.

In some cases, even though a rubberlike polymer is present, the lower liquid monomers and polymers act as solvents or plasticizers for the higher polymer and the rubberlike material does not separate out as such until the unpolymerized material is removed. With certain polymerizable materials, there is a marked tendency for the separation of the highly polymerized, crude rubberlike material and the rubber polymers.

Although the carbon black is preferably incorporated into the polymerizable material considerably before it reaches the plastic or gel-like state, it may also be incorporated into the fluid, partially polymerized material before or after any separation of the more volatile material.

Some polymerizable materials, particularly certain of the hydrocarbons, are more readily polymerized or produce much higher yields of a rubber when they are polymerized in the emulsified state. In accordance with a modification of the present invention, I may make use of this tendency by causing the early polymerization to take place in the emulsion state; then, after the emulsified material has increased substantially in viscosity, causing coagulation of the disperse phase and separation of the water or continuous phase. The relatively viscous or plastic material thus produced is then incorporated into a mold or suitable shaping device where it is polymerized as a continuous phase into a rubber of the desired shape. The polymerizable material in the emulsion should be coagulated, for example, by addition of an electrolyte, before it has reached the stiff, crude rubberlike state where mastication by milling, etc., is required to reduce the plasticity sufficiently for the production of smooth molded articles.

When, as above described, the material is partially polymerized in the form of an aqueous emulsion, or in an emulsion having water or non-miscible liquid as the continuous phase, the sulphur or other vulcanizing agent, if one is necessary for the particular type of rubber, may be incorporated into the emulsion, it being found that it usually remains distributed in the partially polymerized material after coagulation.

The quantity of finely divided carbon incorporated in the polymerizable liquid may, as in the case of natural rubber, be varied in accordance with the properties desired in the resulting rubber. Larger quantities produce a stiffer rubber, and in the case of the type of rubber which is reinforced by carbon black masticated therein, a rubber of higher tensile strength is produced. To obtain any appreciable reinforcement, 10 parts are usually required and 30 to 40 parts, or more, distributed throughout the rubber particles are desirable. As much as 60 or 70 parts, or even more, may be used with 100 parts of the polymerizable liquid base.

Some carbon blacks contain a small amount of oily impurities, which may adversely affect the polymerization of the polymerizable base in the preparation of certain synthetic rubbers. When, therefore, synthetic rubbers which require the compounds, etc., in a relatively high state of purity are to be reinforced in accordance with this invention, the carbon black or lamp black may be purified by suitable means, as by extracting the soluble impurities with a solvent, such as acetone and the like.

It is usually desirable to incorporate one or more polymerization accelerators in the polymerizable liquid, so that the time required for completion of the polymerization to the rubberlike state will be substantially shortened. Polymerization accelerators generally desirable are substances containing oxygen and capable of splitting off oxygen, such as peroxides, including benzoyl peroxide, hydrogen peroxide, metal oxides, acrylic esters, electrolytes and the like.

The following example, in which the parts are by weight, illustrate the present invention:

*Example*

Fifteen parts of butadiene 1-3, 150 parts of a gaseous mixture derived from petroleum cracking gases and consisting essentially of butylenes and their lower homologues, ethylene and propylene, but containing a substantial quantity of amylene and ethylene, may be mixed with 35 parts of carbon black and a small amount of boron trifluoride, aluminum chloride, or other suitable catalyst, in a suitable pressure reaction vessel equipped for continuous agitation.

The normally gaseous ingredients are maintained substantially entirely in their liquid state by regulating the quantities used to the size of the reaction vessel so that a liquifying pressure is maintained at the desired polymerization temperature. The temperature should be chosen so that polymerization progresses at a reasonably controllable rate. Higher temperatures and pressures such as 100 atmosphere or even higher may be desirable when the proportion of relatively rapidly polymerizable olefins, such as isobutylene, is low. The polymerization is permitted to progress until the viscosity of the mix as evidenced by power required for agitation has shown a large increase, indicating that the polymerization of the ingredients has progressed to near the gel-like state, whereupon the pressure is released and the more volatile partial polymers and unpolymerized olefins, etc., are separated. The viscous or plastic, partially polymerized mixture containing the carbon black finely dispersed therein may be further compounded by simply mixing it with sulfur, and a vulcanization accelerator, preferably of that type which is effective only at relatively high temperatures. It is then incorporated in a mold where it is further polymerized to a rubber at slightly elevated temperatures and then cured by raising the temperature producing a molded, unmasticated synthetic rubber article having even more desirable properties, including substantially higher abrasion resistance, than a similar article produced from a masticated compound of identical composition.

When the polymerizable material tends to polymerize with great rapidity, as when it contains a large proportion of isobutylene, it is preferred that substantially the entire polymerization take place within the forming mold. In such cases the mixture within a suitable pressure reservoir, which is connected to the mold cavity to compensate for shrinkage during polymerization, should preferably be cooled below a temperature where rapid polymerization occurs, so that it will remain in a flowable condition until polymerization in the mold cavity has substantially ended.

The delayed action type of vulcanization accelerator is preferred to the ordinary types, although those may be used. The delayed action may be obtained by mixing a suitable retarder with a suitable accelerator. Examples of such mixtures are calcium oleate dispersed on clay or inert material in combination with tetramethyl thiuram monosulphide, monobutyl phthalate in combination with a butyraldehyde-aniline condensation product, etc.

It will be seen from the above that when the material is compounded and injected into the forming mold before the polymerization has progressed to the crude rubberlike state, the long molecular structure of the unmasticated rubber is obtained in the final article and is not thereafter broken down by mastication. Such structure greatly increases the abrasion resistance and usually the strength of the article, so that it is much superior to that of a similarly compounded article having the same quantity of reinforcing agents masticated therein.

By incorporating suitable amounts of polymerization accelerators and if necessary, suitable vulcanization accelerators in the polymerizable material, the polymerization may if desired be completed and the synthetic rubber produced, cured or vulcanized in the desired shape without the use of high vulcanization temperatures.

In the specification the term "mastication" has been frequently used, and refers to mechanical working of rubber or rubberlike material, sufficient in amount to shorten the molecules, as evidenced by lower viscosity in solutions and increased plasticity, and does not refer to the mere stirring of material in the viscous liquid or thixotropic phase.

It is to be understood that variations and modifications of the specific process herein shown and described for purposes of illustration may be made without departing from the spirit of the invention.

What I claim is:

1. In a process for producing an unmasticated reinforced copolymer from a polymerizable material comprising butadiene and isobutylene, the steps which comprise mixing carbon black with an unemulsified liquid mixture, comprising butadiene, isobutylene and ethylene, sufficiently to form an intimate mixture thereof, polymerizing the polymerizable constituents of the mixture in the presence of a suitable catalyst, agitating the mixture during at least part of the polymerization and until a substantial increase in viscosity occurs to prevent agglomeration of the carbon black, separating the unpolymerized constituents after polymerization, incorporating the polymerizable material before the polymerization has reached the crude rubberlike state into a suitable mold, and completing the polymerization in the mold, whereby a shaped article containing carbon black uniformly distributed throughout to improve the product to the extent obtainable when the carbon black is masticated into the rubberlike polymer but without deterioration by mastication is obtained.

2. In a process of producing a copolymer from a polymerizable material comprising a mixture containing butadiene and isobutylene, wherein the polymerization of said butadiene and isobutylene is carried out in the presence of a suitable catalyst below temperatures where polymerization occurs with great rapidity, the steps which comprise intimately mixing finely divided carbon through the unemulsified liquid mixture containing the polymerizable monomeric materials, and agitating the mixture to prevent agglomeration of the finely divided carbon until the polymerization, indicated by a large increase in the viscosity of the polymerizing mixture, has progressed to near the gel-like state, and separating the unpolymerized olefins from the material thus obtained.

3. In a process of producing a copolymer from a polymerizable material comprising a mixture containing butadiene and isobutylene, wherein the polymerization of said butadiene and isobutylene is carried out in the presence of a catalyst comprising aluminum chloride below temperatures where polymerization occurs with great rapidity, the steps which comprise intimately mixing finely divided carbon through the unemulsified liquid mixture containing the polymerizable monomeric materials, and agitating the mixture to prevent agglomeration of the finely divided carbon until the polymerization, indicated by a large increase in the viscosity of the polymirizing mixture, has progressed to near the gel-like state, and separating the unpolymerized olefins from the material thus obtained.

THEODORE A. TE GROTENHUIS.